United States Patent [19]
Adachi et al.

[11] Patent Number: 5,327,584
[45] Date of Patent: Jul. 5, 1994

[54] PORTABLE RADIO HAVING COVER RELEASING MECHANISM AND RECEIVE SWITCH WHICH ARE OPERABLE TOGETHER

[75] Inventors: Naotomo Adachi; Tetsuya Kubo; Ryoichi Kaiwa; Michiyoshi Kudoh, all of Yokohama, Japan

[73] Assignee: Matsushita Electric Industrial Co., Ltd., Osaka, Japan

[21] Appl. No.: 846,144

[22] Filed: Mar. 5, 1992

[30] Foreign Application Priority Data

Mar. 11, 1991 [JP] Japan .................................. 3-044790

[51] Int. Cl.⁵ ............................................ H04M 1/02
[52] U.S. Cl. .......................................... 455/89; 455/90; 455/351; 379/58; 379/433
[58] Field of Search ............ 455/89, 90, 128, 347–349, 455/351; 379/58, 61, 433; D14/138

[56] References Cited

U.S. PATENT DOCUMENTS 5,151,946  9/1992  Martensson ............................ 379/58
5,175,759  12/1992  Metroka et al. ...................... 379/58

FOREIGN PATENT DOCUMENTS 3346492  7/1985  Fed. Rep. of Germany .
62-24549  2/1987  Japan .
0274046  11/1990  Japan .................................... 379/61
706630   3/1954  United Kingdom .
1526491  9/1978  United Kingdom .
2224538  5/1990  United Kingdom .
2235606  3/1991  United Kingdom .

Primary Examiner—Reinhard J. Eisenzopf
Assistant Examiner—Chi Pham
Attorney, Agent, or Firm—Stevens, Davis, Miller & Mosher

[57] ABSTRACT

A cover movably connected to a body of a radio is formed with an engaging hole for locking. A locking engaging projection formed in the radio body can move between the disengaging and engaging positions with respect to the engaging hole, and a switch operating projection formed in the radio body can move between the actuating and releasing positions for a receive switch. When the engaging projection and the switch operating projection are moved in correlation to each other by an operating portion in operation, the engaging projection is disengaged from the engaging hole so as to release the cover, and the receive switch is actuated by the switch operating projection so as to open the cover in call reception.

6 Claims, 2 Drawing Sheets

PORTABLE RADIO HAVING COVER RELEASING MECHANISM AND RECEIVE SWITCH WHICH ARE OPERABLE TOGETHER

BACKGROUND OF THE INVENTION

1. Field of the Invention

The present invention relates to the locking mechanism of a portable radio, such as a portable telephone and an inter-call radio.

2. Description of the Related Art

In a well-known type of portable telephone, as disclosed in, for example, Japanese Utility Model Laid-Open No. 62-24549, a cover is movably connected to a housing of a telephone body. When the telephone is not used, the cover is closed to protect push buttons, a receive button and so on of the telephone body, and when the telephone is used, the cover is opened to expose the above buttons.

However, in the above construction of the prior art, since it is necessary to open the cover in call reception by a manipulation of an operating portion and operate the receive button in order to speak over the telephone, prompt response is not possible.

SUMMARY OF THE INVENTION

The present invention aims to solve the above problem of the prior art. An object of the present invention is to provide a portable radio capable of actuating a receive switch in response to the opening of a cover in call reception, and thus of improving operability and response speed.

In order to achieve the above object, there is provided a mechanical solving means comprising a cover openably connected to a radio body and having a first locking engaging portion, a second locking engaging portion movable between a disengaging position and an engaging position with respect to the first engaging portion in the radio body, a receive switch disposed in the radio body, a switch operating member movable between an actuating position and a releasing position for the receive switch in the radio body, and an operating portion for linking the second engaging portion and the switch operating member.

It is preferable that the second engaging portion, the switch operating member, and the operating portion are urged by a spring to return toward the disengaging position with respect to the first engaging portion and the releasing position for the receive switch.

Therefore, according to the present invention, it is possible to move the second engaging portion and the switch operating member in correlation to each other in operation by a manipulation of the operating portion, to release the cover by disengaging the second engaging portion from the first engaging portion of the cover, and to actuate the receive switch by the switch operating member.

DESCRIPTION OF PREFERRED EMBODIMENT

An embodiment of the present invention will now be described with reference to the accompanying drawings.

Figure 1:
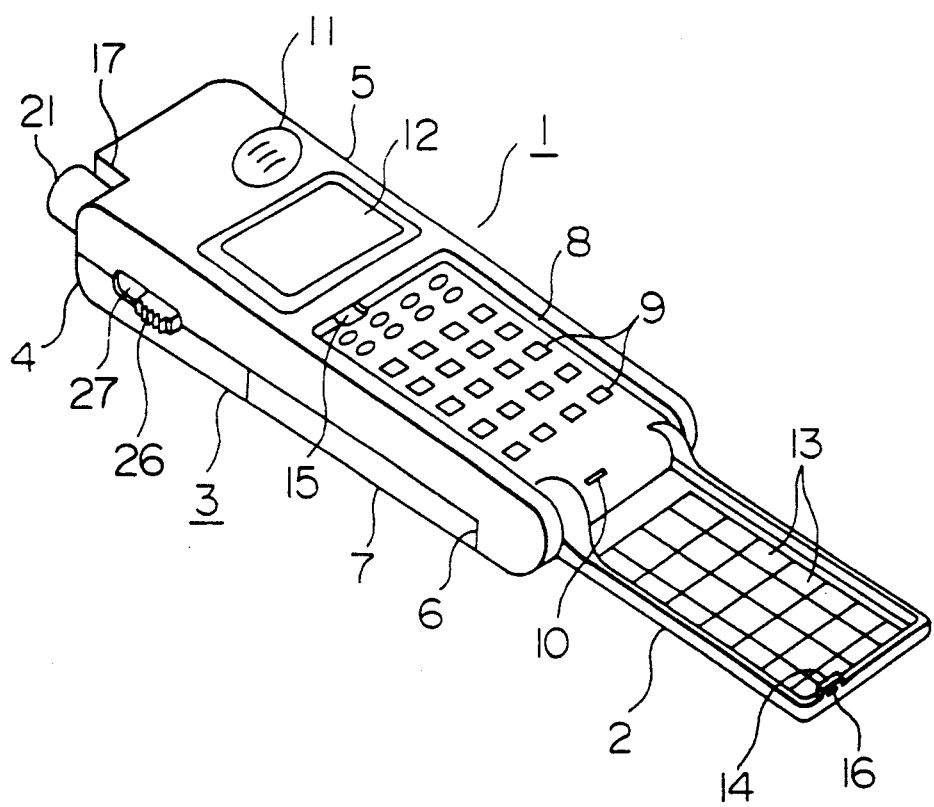
FIG. 1 is a perspective view showing a portable radio according to an embodiment of the present invention in a state in which a cover is open.
Figure 2A:
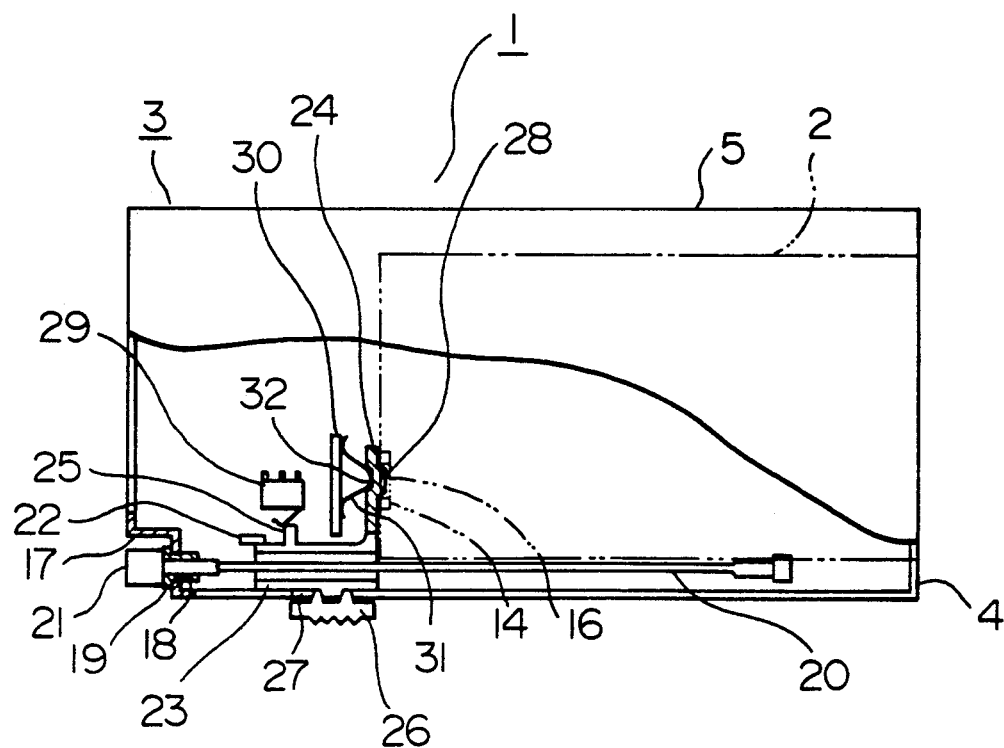
FIG. 2A is a partially cutaway plan view showing a portable radio of the present invention in a state in which the cover is closed.
Figure 2B:
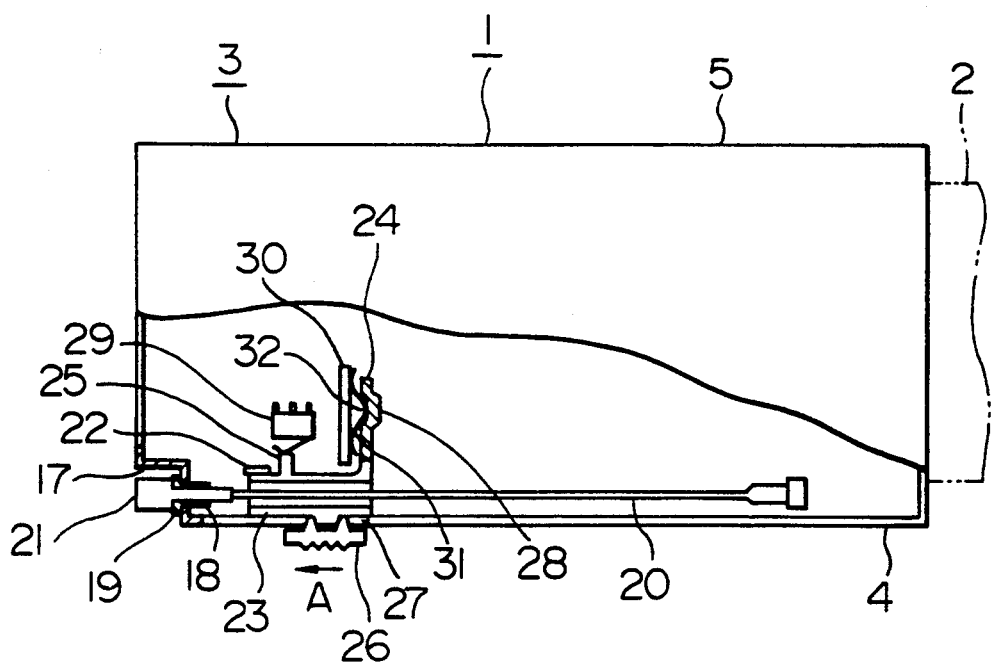
FIG. 2B is a partially cutaway plan view showing the portable radio of FIG. 2A in a state in which the cover is open.

This embodiment is applied to a portable telephone. As shown in FIGS. 1, 2A and 2B, the portable telephone is composed of a telephone body 1 and a cover 2. A housing 3 of the telephone body 1 is composed of a housing body 4 and a lid 5. A battery pack 7 is detachably fitted in a concave portion 6 formed over a range from the center to the lower portion of the back of the housing body 4. A shallow concave portion 8 is formed over a range from the center to the lower portion of the front of the lid 5. Various kinds of push buttons 9 are arranged in the concave portion 8, and a hole 10 for a microphone is formed at the bottom of the concave portion 8. A hole 11 for a speaker is formed in the upper portion of the front of the lid 5, and a display portion 12 for data display is disposed below the hole 11. Flat keys 13 for data input are arranged inside the cover 2, and both sides of the base portion of the cover 2 are rotatably connected to both sides of the bottom of the housing 3 and urged by a torsion spring (not shown) in the opening direction. By rotating the cover 2 against the impact resilience of the torsion spring, it is possible to put the cover 2 in the concave portion 8 of the housing 3 and to cover and protect the push buttons 9 and the flat keys 13. At this time, a projecting portion 14 formed at the leading end of the cover 2 is inserted into the housing 3 through a hole 15 formed at the top of the concave portion 8 of the housing 3. The projecting portion 14 has an engaging hole 16 serving as a first engaging portion for locking. A concave portion 17 is formed on the upper side of the housing 3, and an antenna holder 19 is mounted in a hole 18 formed at the bottom of the concave portion 17. A slidable antenna 20 is slidably passed through the antenna holder 19. The antenna 20 can be retracted in the housing 3 and an antenna top portion 21 can be put in the concave portion 17 by pushing the antenna top portion 21 in order to prevent the antenna 20 from being damaged by the fall and collision with another object, and the antenna 20 can be projected outside the housing 3 by pinching and pulling the antenna top portion 21 in the concave portion 17. A frame-like linking member 23 is disposed slidably in the longitudinal direction of the housing 3, that is, the vertical direction between the inside of the housing 3 and a guide 22 around the antenna 20 in the housing 3. A locking plate 24 and a switch operating projection 25 are integrally projected from the inside of the linking member 23. An operating portion 26 is slidably projected on the side of the linking member 23 opposite to the locking plate 24 and so on through a hole 27 formed on the side of the housing 3. By the manipulation of the operating portion 26 from outside the housing 3, the operating portion 26, the locking plate 24 and the switch operating projection 25 are slid together through the linking member 23 in the use direction (the direction of the arrow A shown in FIG. 2B), and slid and returned together through the linking member 23 in the non-use direction (the direction opposite to the A direction shown in FIG. 2B). The locking plate 24 is formed with an engaging projection 28 serving as a second engaging portion for locking which can engage the engaging hole 16 of the cover 2. The engaging projection 28 of the locking plate 24 can disengage from the engaging hole 16 of the cover 2 and release the cover 2 by sliding together with the operating portion 26 and so on in the use direction as described above, and can return to the engaging position with the engaging hole 16 of the cover 2 by sliding together with the operating portion 26 and so on in the non-use direction as described above. The switch operating projection 25 can actuate a receive switch (microswitch) 29 disposed in the housing 3 by sliding together with the operating portion 26 and so on in the use direction as described above, and can release the receive switch 29 by sliding together with the operating portion 26 and so on in the non-use direction. A stopper 30 is integrally formed in the housing 3 substantially parallel to the locking plate 24, and a wire spring 31 is spread between the locking plate 24 and the stopper 30. In other words, the central projecting portion of the wire spring 31 is engaged with a concave portion 32 formed on the side of the locking plate 24 opposite to the engaging projection 28, and both sides of the wire spring 31 are in contact with the stopper 30. The locking plate 24, the switch operating projection 25, the linking member 23 and the operating portion 26 are urged by the wire spring 31 to return in the non-use direction. When the cover 2 is closed against the impact resilience of the torsion spring and the projecting portion 14 is inserted in the housing 3 through the hole 15 an described above, the engaging hole 16 can be forcibly engaged with the engaging projection 28 against the impact resilience of the wire spring 31.

According to the above construction, operations will now be described.

As shown in FIG. 2A, it is assumed that the locking plate 24, the switch operating projection 25, the linking member 23 and the operating portion 26 are urged by the wire spring 31 and returned in the non-use direction, that the cover 2 is closed and the engaging hole 16 engages the engaging projection 28, and that the antenna 20 is set in the housing 3. As shown in FIG. 2B, the operating portion 26 is pushed in the use direction (the direction of the arrow A) from this state, and the operating portion 26, the linking member 23, the locking plate 24 and the switch operating projection 25 are slid together against the impact resilience of the wire spring 31. In correlation to the slide, the engaging projection 28 of the locking plate 24 can be separated from the engaging hole 16 of the cover 2 so as to open the cover 2 by the impact resilience of the torsion spring as shown in FIG. 1, and the receiver switch 29 can be actuated by the switch operating projection 25. The antenna top portion 21 is pinched, and the antenna 20 is drawn outward, thereby starting the call enable state. Meanwhile, the locking plate 24, the switch operating projection 25, the linking member 23 and the operating portion 26 are returned in the non-use direction due to the impact resilience of the wire spring 31 by releasing the pressure of the operating portion 26.

After an end button is operated at the end of the call, as described above, the cover 2 is closed against the impact resilience of the torsion spring, and the engaging hole 16 is engaged with the engaging projection 28 against the impact resilience of the wire spring 31. Subsequently, the antenna 20 can be retracted in the outer portion of the housing 3 to stand by for the next use.

The present invention is not limited to the above embodiment. Various changes of design may be made without departing from the fundamental technical ideas of the present invention.

According to the present invention, as described above, the cover can be released by moving the second engaging portion and the switch operating member in correlation to each other and disengaging the second engaging portion from the first engaging portion of the cover, and the receive switch can be actuated by the switch operating member. Therefore, it is possible to improve operability and response speed.

What is claimed is:

1. A portable radio comprising:
   a radio body;
   a cover operably connected to said radio body and having a first locking engaging portion;
   a second locking engaging portion movable between a disengaging position and an engaging position with respect to said first engaging portion;
   a receive switch disposed on said radio body;
   a switch operating member movable between an actuating position and a releasing position, for actuating said receive switch; and
   an operating portion for linking said second locking engaging portion and said switch operating member to move together, whereby a user is able, by a single operation, to release said cover and actuate said receive switch, wherein said second locking engaging portion engages said first locking engaging portion when said cover is in a closed position and said second locking engaging portion is in said engaging position, and wherein said second locking engaging portion does not engage said first locking engaging portion when said cover is in an open position or when said second locking engaging portion is in said disengaging position.

2. A portable radio according to claim 1, wherein said first locking engaging portion has a hole and wherein said second locking engaging portion comprises an engaging projection for engaging said hole.

3. A portable radio comprising:
   a radio body;
   a cover operably connected to said radio body and having a first locking engaging portion;
   a second locking engaging portion movable between a disengaging position and an engaging position with respect to said first engaging portion;
   a receive switch disposed on said radio body;
   a switch operating member movable between an actuating position and a releasing position, for actuating said receive switch; and
   an operating portion for linking said second locking engaging portion and said switch operating member to move together, whereby a user is able, by a single operation, to release said cover and actuate said receive switch, wherein said operating portion comprises a linking member integrally formed with said second locking engaging portion and said switch operating member.

4. A portable radio according to claim 3, wherein said second locking engaging portion and said switch operating member are located within said radio body and wherein said operating portion extends partially outside said radio body.

5. A portable radio comprising:
   a radio body;
   a cover operably connected to said radio body and having a first locking engaging portion;

a second locking engaging portion movable between a disengaging position and an engaging position with respect to said first engaging portion;

a receive switch disposed on said radio body;

a switch operating member movable between an actuating position and a releasing position, for actuating said receive switch; and an operating portion for linking said second locking engaging portion and said switch operating member to move together, whereby a user is able, by a single operation, to release said cover and actuate said receive switch, wherein said operating portion comprises means for linking said second locking engaging portion and said switch operating member to be movable integrally together, so that when said operating portion is moved in a use direction, said second locking engaging portion is moved to said disengaging position and said switch operating member is moved to said actuating position, and when said operating portion is moved in a non-use direction, said second locking engaging portion is moved to said engaging position and said switch operating member is moved to said releasing position.

6. A portable radio comprising:

a radio body;

a cover operably connected to said radio body and having a first locking engaging portion;

a second locking engaging portion movable between a disengaging position and an engaging position with respect to said first engaging portion;

a receive switch disposed on said radio body;

a switch operating member movable between an actuating position and a releasing position, for actuating said receive switch; and an operating portion for linking said second locking engaging portion and said switch operating member to move together, whereby a user is able, by a single operation, to release said cover and actuate said receive switch, wherein said cover has a proximal end operably connected to said radio body and a distal end on which said first locking engaging portion is formed.

* * * * *